United States Patent
Chen et al.

(10) Patent No.: US 7,242,652 B2
(45) Date of Patent: Jul. 10, 2007

(54) OPTICAL RECORDING SYSTEM WITH OPTIMAL RECORDING LASER BEAM POWER CONTROL, AND METHOD AND DEVICE FOR GENERATING A MARK FORMATION EFFECTIVENESS SIGNAL IN AN OPTICAL RECORDING SYSTEM

(76) Inventors: Chih-Cheng Chen, 7F, No. 247, Pu-Ting Rd., Hsinchu City (TW); Ding-Jen Liu, No. 9, Alley 50, Lane 162, Kao-Tsui Rd., Hsinchu City (TW); Shun-Fang Tsai, 5F, No. 4, Alley 9, Lane 268, Sec. 1, Kuang-Fu Rd., Hsinchu City (TW); Ming-Yang Chau, No. 132, Tung-Shan St., Yung-Yuan Tsun, Hsin-She Hsiang, Taichung Hsien (TW)

( * ) Notice: Subject to any disclaimer, the term of this patent is extended or adjusted under 35 U.S.C. 154(b) by 527 days.

(21) Appl. No.: 10/285,944

(22) Filed: Oct. 31, 2002

(65) Prior Publication Data
US 2003/0227844 A1    Dec. 11, 2003

(30) Foreign Application Priority Data
Jun. 7, 2002    (TW) ............................. 91112414 A

(51) Int. Cl.
*G11B 7/125*    (2006.01)
(52) U.S. Cl. .............................. 369/47.51; 369/53.22; 369/59.21
(58) Field of Classification Search ............... None
See application file for complete search history.

(56) References Cited

U.S. PATENT DOCUMENTS

| 5,216,660 A |   | 6/1993 | Iimura |           |
|-------------|---|--------|--------|-----------|
| 5,436,880 A | * | 7/1995 | Eastman et al. ......... | 369/47.51 |
| 5,903,537 A |   | 5/1999 | Gage et al. |        |

* cited by examiner

Primary Examiner—William Korzuch
Assistant Examiner—Joseph Haley
(74) Attorney, Agent, or Firm—Thomas, Kayden, Horstemeyer & Risley

(57) ABSTRACT

An optical recording system includes a laser light source that provides an incident recording light signal for recording information on an optical recording medium, an optical detector for detecting a reflected write pulse from the optical recording medium, and a light source controller for controlling recording laser beam power of the laser light source according to a mark formation effectiveness signal generated by a signal generating device. The signal generating device includes an analog peak value detector for detecting a peak value of the reflected write pulse from the optical detector, at least one sample-hold circuit for sampling the reflected write pulse to obtain at least one amplitude value, and a processor for generating the mark formation effectiveness signal according to the peak value and the amplitude value.

4 Claims, 5 Drawing Sheets

OPTICAL RECORDING SYSTEM WITH OPTIMAL RECORDING LASER BEAM POWER CONTROL, AND METHOD AND DEVICE FOR GENERATING A MARK FORMATION EFFECTIVENESS SIGNAL IN AN OPTICAL RECORDING SYSTEM

CROSS REFERENCE TO RELATED APPLICATIONS

This application claims priority to Taiwanese application No. 091112414, filed Jun. 7, 2002.

BACKGROUND OF THE INVENTION

1. Field of the Invention

The invention relates to an optical recording system with optimal recording laser beam power control, more particularly to an optical recording system using a method and device for generating mark formation effectiveness signals to optimally control the power of a recording laser beam.

2. Description of the Related Art

To record information on an optical recording medium, a light source of an optical recording system, such as a laser diode that is driven by a laser driver circuit according to a write control signal, generates an incident recording light signal on the optical recording medium. To assure that data is correctly recorded, it is important that the laser output must be maintained at an appropriate power level. The optimal power control (OPC) technique is widely employed in determining the initial laser power of incident recording light signals. In an optical recording medium, there is a section called Power Calibration Area (PCA) which is reserved for power testing and calibration. Before the actual data is recorded on the medium, a predetermined data stream is written on the PCA using a series of laser light signals at different power levels. Then, the recorded records in the PCA are read back using normal read power and are analyzed to determine the optimum power. The recording power level that yielded the best recording quality in the PCA is selected as the optimum power level of incident recording light signals for recording the actual data on sections of the optical recording medium. In practice, for most optical recording systems, due to various factors affecting optical recording systems and optical recording media, such as changes in the thickness of recording dye layer and substrate characteristics of optical recording media, changes in recording points due to shifting in laser optical path length, the spatial position relationship of recording media with respect to the optical recording system, changes in recording characteristics of recording media due to temperature variations, etc., the optimum power level for generating the best incident recording light signal is prone to vary as well. Therefore, when the recording signal power is too low, information cannot be completely recorded. Furthermore, when the recording signal power is too high, damage to recorded tracks can occur.

U.S. Pat. No. 5,216,660 discloses an optical recording system that addresses the aforesaid problem. As shown in FIG. 1, the optical recording system 1 of U.S. Pat. No. 5,216,660 includes a laser light source 10, an optical detector 11, a first sample-hold circuit 12, a second sample-hold circuit 13, a timing controller 14, a first analog-to-digital (A/D) converter 15, a second analog-to-digital (A/D) converter 16, a processor 17, a laser driver circuit 18, and a digital-to-analog (D/A) converter 19. The laser light source 10 provides an incident recording light signal (IRL) (see FIG. 2A) for recording information on an optical recording medium 2. The laser light source 10 is generally a laser diode mounted on an optical pickup head (OPU) and is driven by the laser driver circuit 18 according to a write control signal. The optical detector 11 detects a reflected write pulse (WRF) (see FIG. 2B) that is a reflection of the incident recording light signal from the optical recording medium 2. The reflected write pulse (WRF) is provided to the first and second sample-hold circuits 12, 13 for sampling. With further reference to FIGS. 2C and 2D, the timing controller 14 provides first and second sampling pulses ($t_A$, $t_B$) to the first and second sample-hold circuits 12, 13, respectively, to control the time and duration of sampling by the sample-hold circuits 12, 13. Thus, as shown in FIG. 2B, the first sample-hold circuit 12 can be used to detect a higher power level ($V_A$) of the reflected write pulse (WRF), whereas the second sample-hold circuit 13 can be used to detect a lower power level ($V_B$) of the reflected write pulse (WRF) Thereafter, the higher and lower power levels ($V_A$, $V_B$) are converted into digital form by the first and second A/D converters 15, 16 for processing by the processor 17 to obtain the value of $V_A/(V_A-V_B)$. The value of $V_A/(V_A-V_B)$ is then subtracted from a target value $M_a$, and the resulting difference is converted into an analog control signal by the D/A converter 19 for controlling the laser driver circuit 18 to drive the laser light source 10 so that, when the effective output power of the laser light source 10 reaches a value $M_b$, $V_A/(V_A-V_B)$ is equal to $M_a$, as shown in FIG. 3. Through this closed-loop control scheme, the laser light source 10 outputs an optimal effective power $M_b$.

The following are some of the drawbacks of the aforesaid conventional optical recording system 1:

1. Ideally, the first sample-hold circuit 12 samples a maximum power level of the reflected write pulse (WRF). In practice, the timing of occurrence of the peak value of the reflected write pulse (WRF) is not fixed, and is actually subject to change according to various factors, such as changes in the thickness of recording dye layer and substrate characteristics of optical recording media, skewing of the optical recording medium, etc. Since the time of sampling by the first sample-hold circuit 12 is fixed, and since the actual occurrence of the peak value of the reflected write pulse (WRF) is instantaneous, the first sample-hold circuit 12 is usually unable to detect the peak value of the reflected write pulse (WRF).

2. The first and second sample-hold circuits 12, 13 are coupled to the first and second A/D converters 15, 16, respectively. When additional sample-hold circuits are installed to increase the number of sampled values of the reflected write pulse (WRF), a corresponding increase in the number of the A/D converters will be required as well. This not only results in increased manufacturing costs, but also complicates the entire circuit configuration.

SUMMARY OF THE INVENTION

Therefore, the main object of the present invention is to provide an optical recording system capable of generating optimal recording laser beam power automatically to overcome the aforesaid drawbacks associated with the prior art.

Another object of the present invention is to provide a method and device for generating mark formation effectiveness signals in an optical recording system to optimally control the power of a recording laser beam.

According to one aspect of the present invention, there is provided a method of optimally controlling the power of a recording laser beam in an optical recording system. The optical recording system includes a laser light source operable so as to provide an incident recording light signal for recording information on an optical recording medium. The method comprises the steps of:

a) detecting a reflected write pulse that is a reflection of the incident recording light signal from the optical recording medium;

b) detecting a peak value of the reflected write pulse, and sampling the reflected write pulse to obtain at least one amplitude value;

c) generating a mark formation effectiveness signal according to the peak value and said at least one amplitude value obtained in step b), the mark formation effectiveness signal corresponding to the information recorded on the optical recording medium and being usable to check whether the information is properly recorded on the optical recording medium; and d) controlling recording laser beam power of the laser light source according to the mark formation effectiveness signal obtained in step c) for optimum information recording.

According to another aspect of the present invention, there is provided an optical recording system that comprises:

a laser light source operable so as to provide an incident recording light signal for recording information on an optical recording medium;

an optical detector for detecting a reflected write pulse that is a reflection of the incident recording light signal from the optical recording medium;

a signal generating device coupled to the optical detector and including an analog peak value detector for detecting a peak value of the reflected write pulse from the optical detector, at least one sample-hold circuit for sampling the reflected write pulse to obtain at least one amplitude value, and a processor coupled to the analog peak value detector and said at least one sample-hold circuit, the processor generating a mark formation effectiveness signal according to the peak value from the analog peak value detector and said at least one amplitude value from said at least one sample-hold circuit, the mark formation effectiveness signal corresponding to the information recorded on the optical recording medium and being usable to check whether the information is properly recorded on the optical recording medium; and a light source controller coupled to the laser light source and the signal generating device, the light source controller controlling recording laser beam power of the laser light source according to the mark formation effectiveness signal from the signal generating device for optimum information recording.

According to yet another aspect of the present invention, there is provided a method for generating a mark formation effectiveness signal in an optical recording system. The optical recording system includes a laser light source operable so as to provide an incident recording light signal for recording information on an optical recording medium, and an optical detector for detecting a reflected write pulse that is a reflection of the incident recording light signal from the optical recording medium. The mark formation effectiveness signal is used to control recording laser beam power of the laser light source for optimum information recording. The method comprises the steps of:

a) detecting a peak value of the reflected write pulse, and sampling the reflected write pulse to obtain at least one amplitude value; and b) generating the mark formation effectiveness signal according to the peak value and said at least one amplitude value obtained in step a), the mark formation effectiveness signal corresponding to the information recorded on the optical recording medium and being usable to check whether the information is properly recorded on the optical recording medium.

According to a further aspect of the present invention, there is provided a signal generating device for generating a mark formation effectiveness signal in an optical recording system. The optical recording system includes a laser light source operable so as to provide an incident recording light signal for recording information on an optical recording medium, an optical detector for detecting a reflected write pulse that is a reflection of the incident recording light signal from the optical recording medium, and a light source controller coupled to the laser light source for controlling recording laser beam power of the laser light source according to the mark formation effectiveness signal for optimum information recording. The signal generating device comprises:

an analog peak value detector adapted to be coupled to the optical detector for detecting a peak value of the reflected write pulse from the optical detector;

at least one sample-hold circuit adapted to be coupled to the optical detector for sampling the reflected write pulse to obtain at least one amplitude value; and a processor coupled to the analog peak value detector and said at least one sample-hold circuit, the processor generating the mark formation effectiveness signal according to the peak value from the analog peak value detector and said at least one amplitude value from said at least one sample-hold circuit, the mark formation effectiveness signal corresponding to the information recorded on the optical recording medium and being usable to check whether the information is properly recorded on the optical recording medium, the processor being adapted to be coupled to the light source controller for providing the mark formation effectiveness signal to the light source controller.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
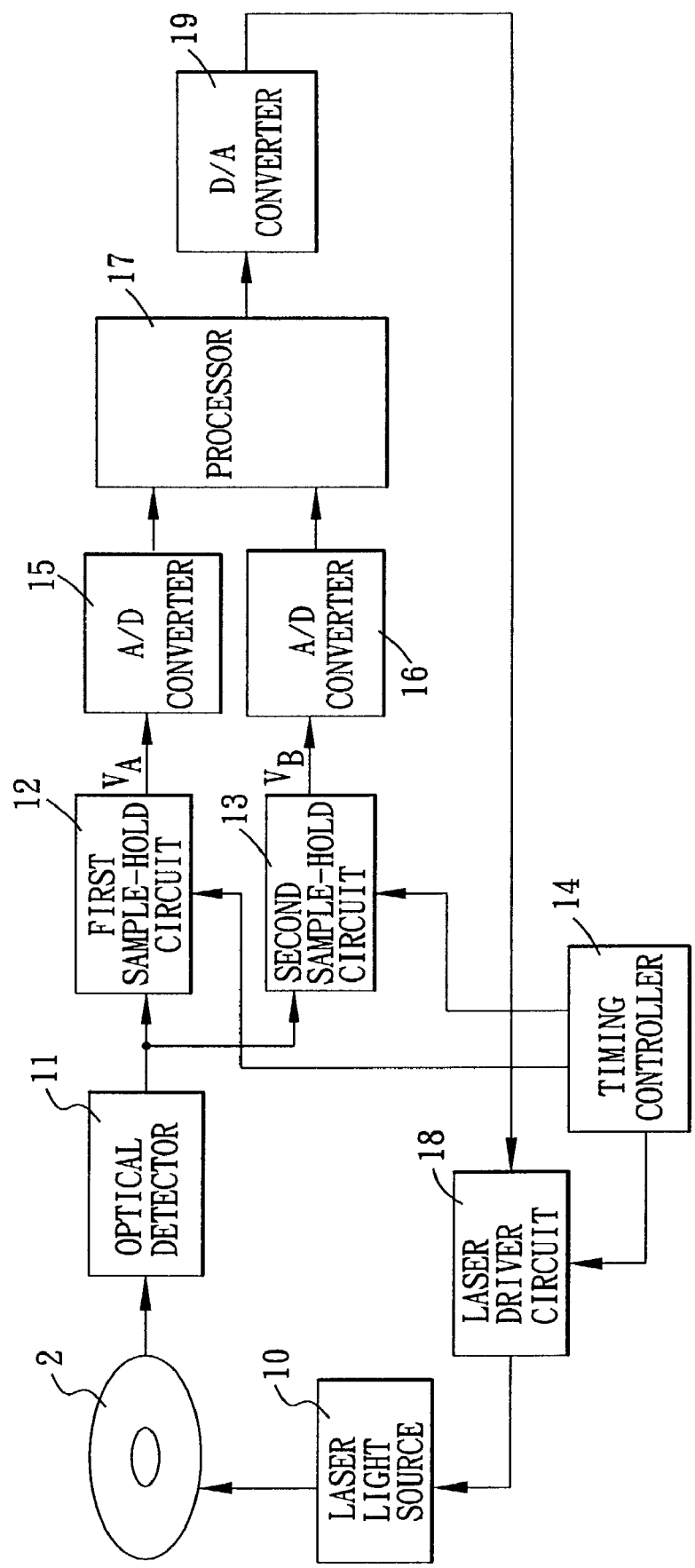
FIG. 1 is a schematic block diagram of a conventional optical recording system.
Figure 2A:
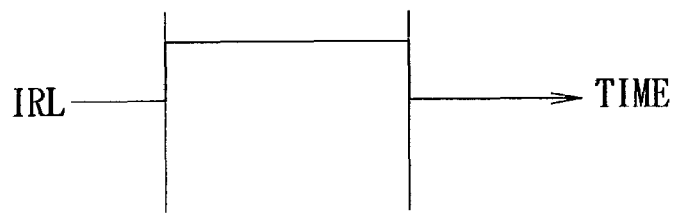
FIGS. 2A to 2D illustrate an incident recording light signal (IRL), a reflected write pulse (WRF), and first and second sampling pulses ($t_A$, $t_B$) generated in the conventional optical recording system of FIG. 1.
Figure 2B:
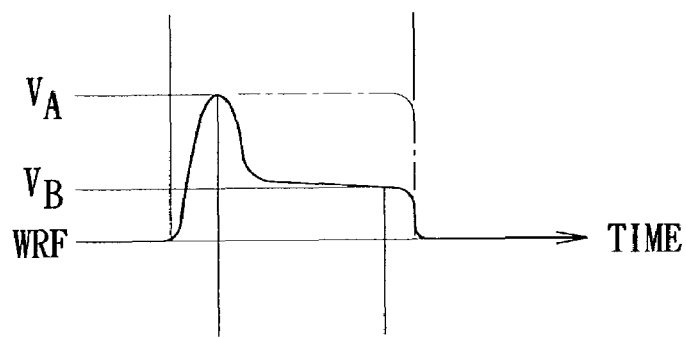
Figure 2C:
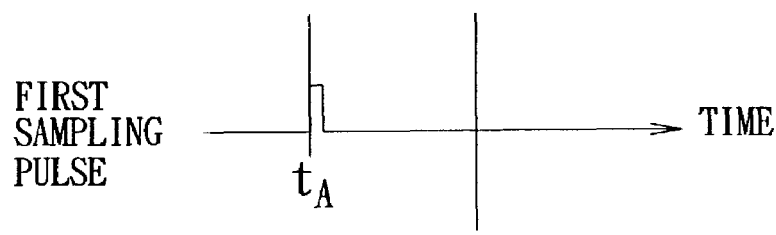
Figure 2D:
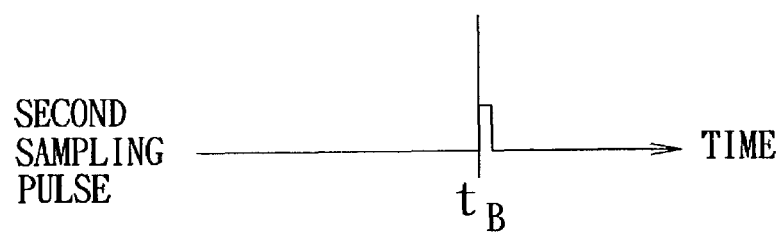
Figure 3:
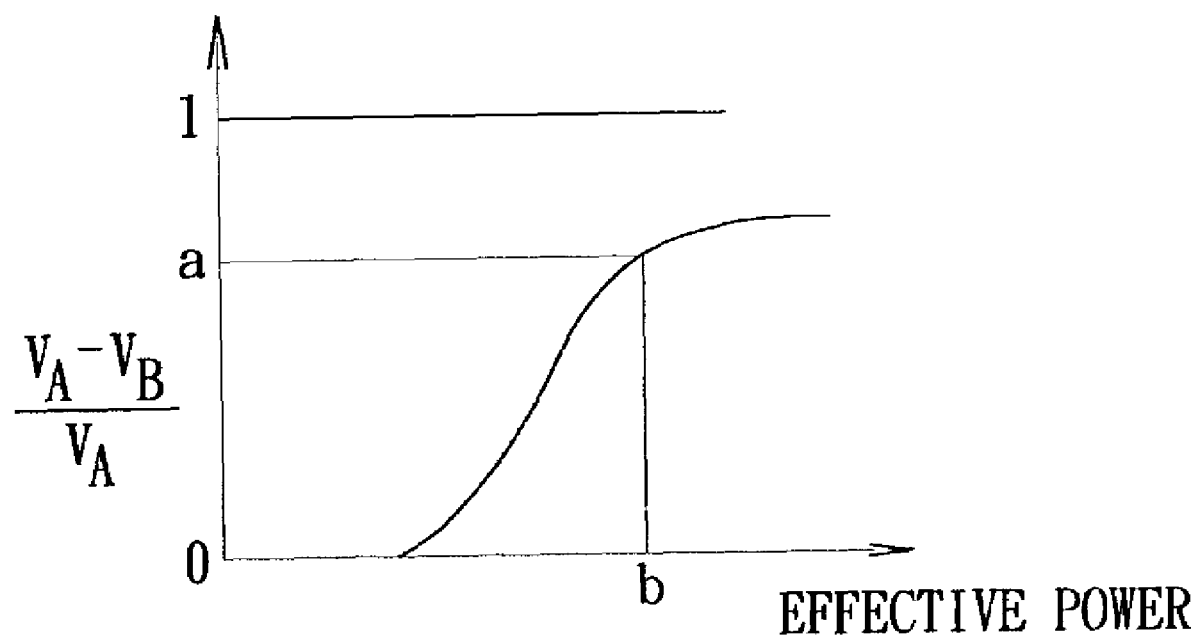
FIG. 3 is a graph showing the recording characteristic of an optical recording medium in the conventional optical recording system of FIG. 1.
Figure 4:
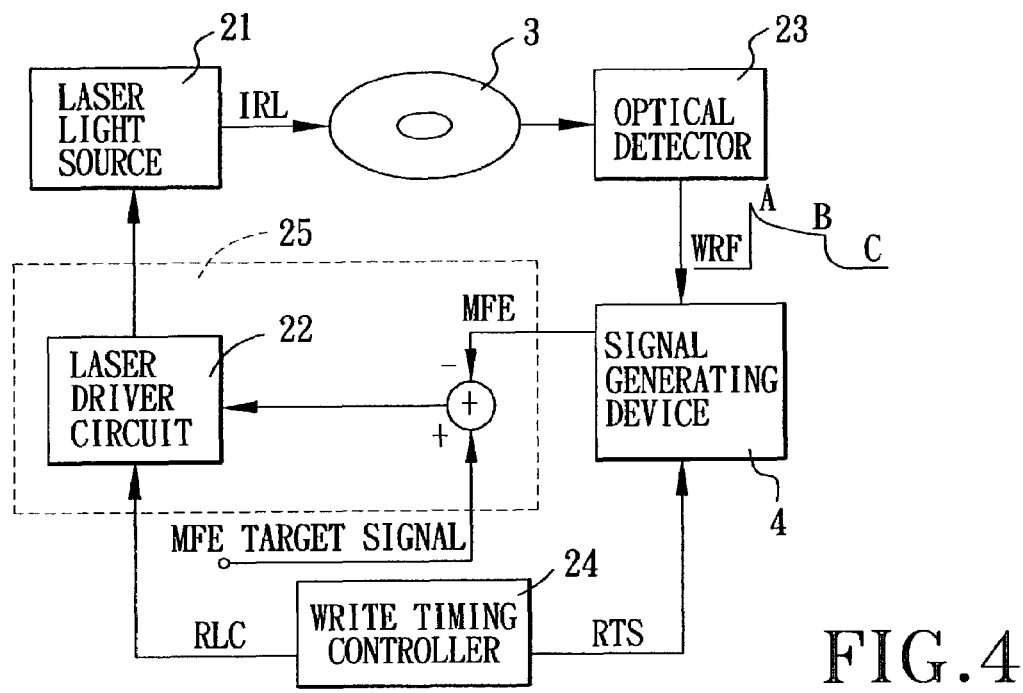
FIG. 4 is a schematic block diagram of the preferred embodiment of an optical recording system according to the present invention.
Figure 6A:
FIGS. 6A to 6J illustrate a recording laser control signal (RLC), an incident recording light signal (IRL), a reflected write pulse (WRF), write timing pulses (RTS), a peak detection control signal (PKA_RST), first and second sampling pulses (SH_B, SH_C), and multiplexer control signals (UTA, UTB, UTC) generated in the optical recording system of the preferred embodiment.
Figure 6B:

FIG. 4 illustrates the preferred embodiment of an optical recording system according to the present invention. The optical recording system is adapted to be loaded with an optical recording medium 3, and is shown to include a laser light source 21, a light source controller 25 coupled to the laser light source 21 for driving operation of the same, an optical detector 22, a signal generating device 4 coupled to the optical detector 22, and a write timing controller 24. The laser light source 21 is a laser diode, and is operable so as to provide an incident recording light signal (IRL) (see FIG. 6B) for recording information on the optical recording medium 3 in a known manner. The light source controller 25 includes a laser driver circuit 22. The write timing controller 24 provides a recording laser control signal (RLC) (see FIG. 6A) and write timing pulses (RTS) (see FIG. 6D). The recording laser control signal (RLC) is used for controlling the laser driver circuit 22 to drive the laser light source 21 for generating the incident recording light signal (IRL) when recording information on the optical recording medium 3. The optical detector 23 is disposed on a light reflection path for detecting a reflected write pulse (WRF) (see FIG. 6C) that is a reflection of the incident recording light signal (IRL) from the optical recording medium 3. The reflected write pulse (WRF) includes a portion that corresponds to the recorded information. The signal generating device 4 generates a mark formation effectiveness signal (MFE) that is based on the reflected write pulse (WRF) and that corresponds to the information recorded on the optical recording medium 3.

Figure 5:
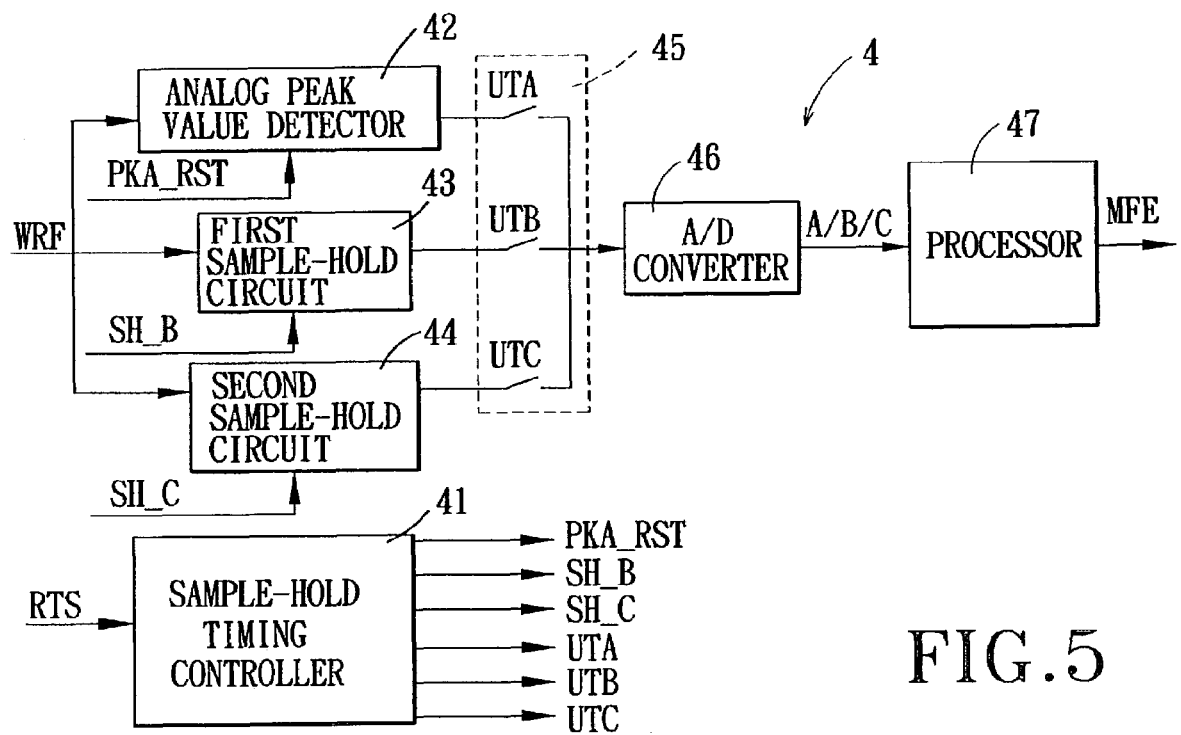
FIG. 5 is a schematic block diagram showing a signal generating device of the preferred embodiment.

As shown in FIG. 5, in this embodiment, the signal generating device 4 includes a sample-hold timing controller 41, an analog peak value detector 42, a first sample-hold circuit 43, a second sample-hold circuit 44, a multiplexer 45, an analog-to-digital (A/D) converter 46, and a processor 47. The sample-hold timing controller 41 is coupled to the write timing controller 24, the analog peak value detector 42, the first sample-hold circuit 43, the second sample-hold circuit 44, and the multiplexer 45. Each of the analog peak value detector 42, the first sample-hold circuit 43 and the second sample-hold circuit 44 is further coupled to the optical detector 23 at one end, and to the A/D converter 46 at the other end through the multiplexer 45.

Generation of the mark formation effectiveness signal (MFE) in the optical recording system of this invention will now be described in the following paragraphs.

Figure 6C:
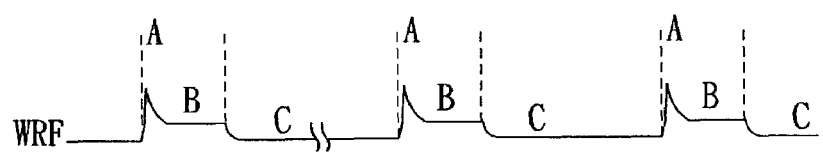
Figure 6D:
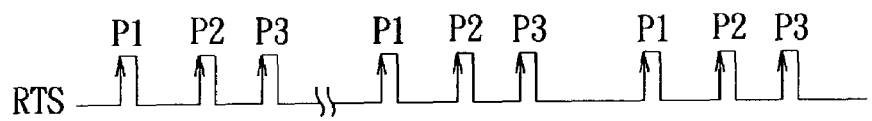
Figure 6E:
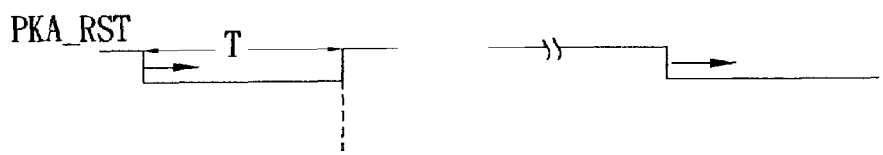
Figure 6F:
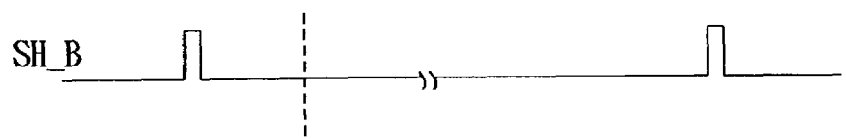
Figure 6G:

Initially, a peak value (A) (see FIG. 6C) of the reflected write pulse (WRF) is detected by the analog peak value detector 42, and the reflected write pulse (WRF) is sampled by the first and second sample-hold circuits 43, 44 to obtain a pair of amplitude values (B, C) (see FIG. 6C). In order to control the operations of the analog peak value detector 42 and the first and second sample-hold circuits 43, 44, the sample-hold timing controller 41 receives the write timing pulses (RTS) (see FIG. 6D) from the timing controller 24, generates a peak detection control signal (PKA_RST) (see FIG. 6E) for controlling the analog peak value detector 42, and further generates first and second sampling pulses (SH_B, SH_C) (see FIGS. 6F and 6G) for controlling the first and second sample-hold circuits 43, 44, respectively. Therefore, when recording information on the optical recording medium 3, the write timing controller 24 will set the recording laser control signal (RLC) (see FIG. 6A) to the high logic state so that the laser light source 21 will be driven by the laser driver circuit 22 to generate the incident recording light signal (IRL) (see FIG. 6B). The write timing controller 24 further outputs a first pulse (P1) of the write timing pulses (RTS) (see FIG. 6D) that leads the incident recording light signal (IRL) and the recording laser control signal (RLC) such that, when the laser light source 21 generates the incident recording light signal (IRL), the first pulse (P1) will activate the sample-hold timing controller 41 to switch the peak detection control signal (PKA_RST) (see FIG. 6E) from the high logic state to the low logic state, thereby switching the analog peak value detector 42 from a reset state and enabling the latter to begin detection of the peak value (A) of the reflected write pulse (WRF) (see FIG. 6C). In other words, when the reflected write pulse (WRF) is detected by the optical detector 23 as a reflection of the incident recording light signal (IRL) from the optical recording medium 3 and is received by the analog peak value detector 42, the analog peak value detector 42 can proceed to detect the peak value (A) of the reflected write pulse (WRF). Since the time period (T) during which the peak detection control signal (PKA_RST) switches from the high logic state to the low logic state is designed to be larger than that of the cycle of the reflected write pulse (WRF) (see FIGS. 6C and 6E), detection of the peak value (A) by the analog peak value detector 42 can be ensured. Thereafter, the second and third pulses (P2, P3) of the write timing pulses (RTS) will drive the sample-hold timing controller 41 to generate the first and second sampling pulses (SH_B, SH_C) (see FIGS. 6F and 6G) that are provided to the first and second sample-hold circuits 43, 44, respectively, thereby enabling the first and second sample-hold circuits 43, 44 to obtain first and second amplitude values (B, C) of the reflected write pulse (WRF) (see FIG. 6C), respectively.

Figure 6H:
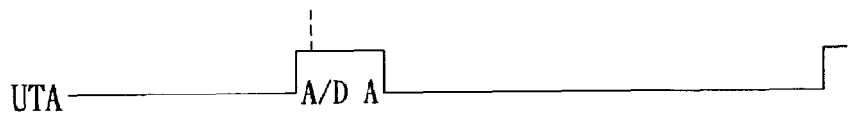
Figure 6I:
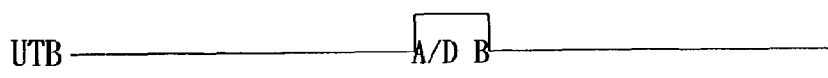
Figure 6J:

Subsequently, before the peak detection control signal (PKA_RST) switches from the low logic state back to the high logic state, since the analog peak value detector 42 has completed detection of the peak value (A) of the reflected write pulses (WRF), the sample-hold timing controller 41 outputs a first multiplexer control signal (UTA) (see FIG. 6H) to the multiplexer 45 to make connection between the analog peak value detector 42 and the A/D converter 46 such that the peak value (A) is sent to the A/D converter 46 for conversion into digital form and for subsequent reception by the processor 47. In other words, the peak value (A) is provided to the A/D converter 46 for sampling, and after the A/D converter 46 has sampled the peak value (A), the analog peak value detector 42 will be reset accordingly. Thereafter, since the first sample-hold circuit 43 has completed sampling of the first amplitude value (B) when the processor 47 receives the digitized peak value (A), the sample-hold timing controller 41 will output a second multiplexer control signal (UTB) (see FIG. 6I) to the multiplexer 45 to make connection between the first sample-hold circuit 43 and the A/D converter 46 such that the first amplitude value (B) is sent to the A/D converter 46 for conversion into digital form and for subsequent reception by the processor 47. Afterwards, since the second sample-hold circuit 44 has completed sampling of the second amplitude value (C) when the processor 47 receives the digitized first amplitude value (B), the sample-hold timing controller 41 will output a third multiplexer control signal (UTC) (see FIG. 6J) to the multiplexer 45 to make connection between the second sample-hold circuit 44 and the A/D converter 46 such that the second amplitude value (C) is sent to the A/D converter 46 for conversion into digital form and for subsequent reception by the processor 47. After the set of the peak value (A), the first amplitude value (B), and the second amplitude value (C) of a current reflected write pulse (WRF) has been digitized, the aforesaid steps will be repeated for detecting the peak value (A), the first amplitude value (B) and the second amplitude value (C) of a succeeding reflected write pulse (WRF). Because the change in consecutive reflected write pulses (WRF) is relatively slow in comparison with the aforesaid detecting and digitizing cycle, there is no need to proceed with the above detection operation for each reflected write pulse (WRF). Therefore, the multiplexer 45 can be used to control connection of each of the analog peak value detector 42 and the first and second sample-hold circuits 43, 44 to the A/D converter 46 in sequence. The configuration as such involves the use of a low-cost, low-power consumption, and low-speed A/D converter 46 as compared to the components of the conventional optical recording system 1 described beforehand.

In practice, the number of sample-hold circuits used in the optical recording system of this invention can be adjusted according to the actual precision requirement.

The mark formation effectiveness signal (MFE) can be generated by the processor 47 by applying an MFE algorithm on a set of the peak value (A), the first amplitude value (B), and the second amplitude value (C) received by the processor 47. The mark formation effectiveness signal (MFE) represents the quality of information recorded on the optical recording medium 3 as detected from the reflected write pulses (WRF). Since there are many MFE algorithms available in the prior art, such as the aforesaid $V_A/(V_A-V_B)$ described beforehand, further description of the same is omitted herein for the sake of brevity.

Moreover, it is known from the prior art that, when optimal recording laser beam power is outputted, a best mark formation effectiveness signal (MFE) will be generated, and the value of the best mark formation effectiveness signal (MFE) is fixed. Therefore, as shown in FIG. 4, the best mark formation effectiveness signal (MFE) is used as an MFE target signal in the optical recording system of this invention, and the difference between the mark formation effectiveness signal (MFE) generated by the signal generating device 4 and the MFE target signal is used by the light source controller 25 to control the recording laser beam power of the laser light source 21 accordingly for optimum information recording. This feedback mechanism can result in gradual adjustment of the mark formation effectiveness signals (MFE) from the signal generating device 4 to approximate the MFE target signal for the purpose of outputting optimal recording laser beam power, thus ensuring the best recording quality on the optical recording medium 3.

In summary, by using the analog peak value detector 42 to detect the peak value (A) of reflected write pulses (WRF), with the peak value detecting period (T) longer than the cycle of each reflected write pulse (WRF), the optical recording system of this invention can ensure that the peak value (A) is accurately detected regardless of recording media factors that can affect position of the peak value (A) in the reflected write pulse (WRF) Moreover, by using the multiplexer 45 and the single A/D converter 46, the optical recording system of this invention can reduce manufacturing costs, allow flexibility in the number of sample-hold circuits, and simplify the entire circuit design as compared to the conventional optical recording system 1 described beforehand. The objects of the present invention are thus met.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

We claim:

1. An optical recording system comprising:

a laser light source operable so as to provide an incident recording light signal for recording information on an optical recording medium;

an optical detector for detecting a reflected write pulse that is a reflection of the incident recording light signal from the optical recording medium;

a signal generating device coupled to said optical detector and including an analog peak value detector for detecting a peak value of the reflected write pulse from said optical detector, at least one sample-hold circuit for sampling the reflected write pulse to obtain at least one amplitude value, a processor coupled to said analog peak value detector and said at least one sample-hold circuit, said processor generating a mark formation effectiveness signal according to the peak value from said analog peak value detector and said at least one amplitude value from said at least one sample-hold circuit, the mark formation effectiveness signal corresponding to the information recorded on the optical recording medium, an analog-to-digital converter that interconnects said analog peak value detector and said at least one sample-hold circuit to said processor, said analog-to-digital converter converting the peak value from said analog peak value detector and said at least one amplitude value from said at least one sample-hold circuit into digital form for subsequent reception by said processor, and a multiplexer for controlling connection of each of said analog peak value detector and said at least one sample-hold circuit to said analog-to-digital converter; and a light source controller coupled to said laser light source and said signal generating device, said light source controller controlling recording laser beam power of said laser light source according to the mark formation effectiveness signal from said signal generating device for optimum information recording.

2. The optical recording system as claimed in claim 1, wherein said signal generating device further includes a timing controller connected to said analog peak value detector, said at least one sample-hold circuit and said multiplexer, said timing controller controlling duration of detection by said analog peak value detector, sampling duration of said at least one sample-hold circuit, and connecting operation of said multiplexer.

3. A signal generating device for generating a mark formation effectiveness signal in an optical recording system, the optical recording system including a laser light source operable so as to provide an incident recording light signal for recording information on an optical recording medium, an optical detector for detecting a reflected write pulse that is a reflection of the incident recording light signal from the optical recording medium, and a light source controller coupled to the laser light source for controlling recording laser beam power of the laser light source according to the mark formation effectiveness signal for optimum information recording, said signal generating device comprising:

an analog peak value detector adapted to be coupled to the optical detector for detecting a peak value of the reflected write pulse from the optical detector;

at least one sample-hold circuit adapted to be coupled to the optical detector for sampling the reflected write pulse to obtain at least one amplitude value;

a processor coupled to said analog peak value detector and said at least one sample-hold circuit, said processor generating the mark formation effectiveness signal according to the peak value from said analog peak value detector and said at least one amplitude value from said at least one sample-hold circuit, the mark formation effectiveness signal corresponding to the information recorded on the optical recording medium, said processor being adapted to be coupled to the light source controller for providing the mark formation effectiveness signal to the light source controller;

an analog-to-digital converter that interconnects said analog peak value detector and said at least one sample-hold circuit to said processor, said analog-to-digital converter converting the peak value from said analog peak value detector and said at least one amplitude value from said at least one sample-hold circuit into digital from for subsequent reception by said processor; and a multiplexer for controlling connection of each of said analog peak value detector and said at least one sample-hold circuit to said analog-to-digital converter.

4. The signal generating device as claimed in claim 3, further comprising a timing controller connected to said analog peak value detector, said at least one sample-hold circuit and said multiplexer, said timing controller controlling duration of detection by said analog peak value detector, sampling duration of said at least one sample-hold circuit, and connecting operation of said multiplexer.

* * * * *